United States Patent
Bratton et al.

[11] Patent Number: 5,935,440
[45] Date of Patent: Aug. 10, 1999

[54] MEMBRANE

[76] Inventors: Graham John Bratton, 154 Old Farm Avenue, Sidcup, United Kingdom, DA15 8AL; Karon Doreen Buck, Alancroft Kingsfield Road, West Kingsdown, United Kingdom, TN15 6LH; Timothy De Villiers Naylor, Englefield Green, United Kingdom, TW2 0NQ

[21] Appl. No.: 08/809,134

[22] PCT Filed: Sep. 19, 1996

[86] PCT No.: PCT/GB95/02221

§ 371 Date: Mar. 14, 1997

§ 102(e) Date: Mar. 14, 1997

[87] PCT Pub. No.: WO96/09110

PCT Pub. Date: Mar. 28, 1996

[30] Foreign Application Priority Data

Sep. 20, 1994 [GB] United Kingdom .................. 94 19050
Sep. 20, 1994 [GB] United Kingdom .................. 94 19046
Sep. 20, 1994 [GB] United Kingdom .................. 94 19051

[51] Int. Cl.$^6$ ............................ B01D 39/00; B29D 65/00
[52] U.S. Cl. ............................. 210/500.25; 210/500.26; 210/502.1; 264/45.1; 264/48; 264/49; 96/4

[58] Field of Search .................. 210/500.25, 500.26, 210/502.1, 651; 264/45.49, 45.1; 96/4; 95/45

[56] References Cited

U.S. PATENT DOCUMENTS

| 5,019,263 | 5/1991 | Haag Et al. ........................ 210/500.25 |
| 5,362,522 | 11/1994 | Barri et al. ................................ 427/435 |
| 5,716,527 | 2/1998 | Deckman et al. ....................... 210/490 |

FOREIGN PATENT DOCUMENTS

| 0322866 | 7/1989 | European Pat. Off. . |
| 9319840 | 10/1993 | WIPO . |
| 9319841 | 10/1993 | WIPO . |

OTHER PUBLICATIONS

High Permselectivities of Microporous Silica–Modified Y–Alumina Membranes, Journal of Material Science Letters—1989.

Primary Examiner—Ana Fortuna
Attorney, Agent, or Firm—Ronald B. Sherer

[57] ABSTRACT

A process for treatment of zeolite membranes to improve performance which comprises contacting the membrane with a silicic acid or a mixture of silicic acids.

29 Claims, 1 Drawing Sheet

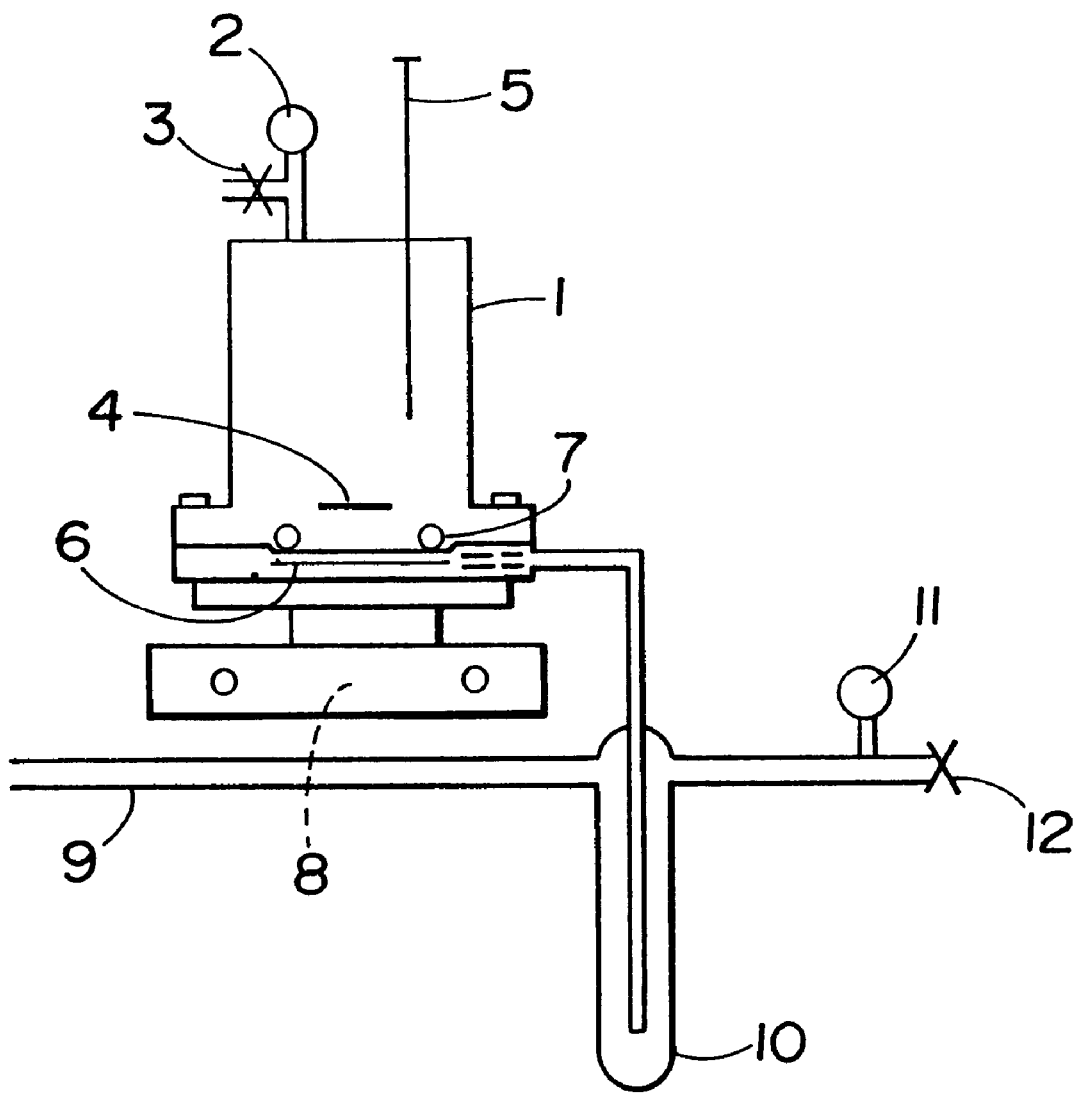

MEMBRANE

The present invention relates to an improved membrane and a process for producing improved membranes.

It is well known to use zeolites and similar crystalline zeolitic materials in separations and as catalysts. Zeolitic membranes and membranes which incorporate zeolites are also well known and can come in a range of different types. European Patent Application 0481660 discloses and discusses prior art zeo-type membranes and refers in particular to U.S. Pat. Nos. 3,244,643, 3,730,910 and 4,578,372, Applied Catalysts 49(1989) 1-25, DE-A-3827049, CA1235684, JP-A-63287504, JP-A-63291809, EP-A-180200, EP-A-135069.

It is disclosed in EP 0481 658 Al to surface coat a porous support on which a zeo-type material is deposited by crystallisation from a synthesis gel with a surface coating of nickel cobalt or molybdenum in the form of the metal and/or oxide.

The methods disclosed for forming this surface coating include vapor deposition, vacuum evaporation, Rf sputtering or electroplating or deposition of a salt from a liquid and oxidising the salt. These methods give a surface coating on the porous support of varying thicknesses and provide for improved crystal deposition from the gel mainly round the wires of the support with little improvement in filling the voids after a single growth. EP 0481 659 Al discloses a similar process for pre-treating a porous support, except that the porous support is pre-treated with an acid.

The process of EP 0481660 Al discloses treating the porous support a plurality of times with the synthesis gel and crystalising a zeo-type material from the gel in order to obtain an improved coating. However, this process can leave gel and other debris blocking the pores of the porous support and thus prevent complete coverage, even wiping between zeolite growths will leave debris behind.

However, these processes do not produce a defect free membrane without a plurality of growths and they do not bridge the voids after a single growth, and even though these patent applications disclose repeated retreatment with the gel as being required to block "pin holes", these existing methods have not proved successful.

Even small defects or pinholes can have a marked deleterious effect on the performance of membranes and can render them of substantially little value in many operations. This is because in many separation operations the effect of defects is essentially to provide a channel where the unseparated products can pass.

Some existing methods claim that a defect free membrane is obtained on a laboratory scale, but attempts to provide a substantially defect free membrane on a larger scale have proved unsuccessful.

In order to provide an improved membrane with better performance characteristics, we have devised a treatment for such membranes.

According to the invention, there is provided a process for treating a membrane comprising a film of a crystalline zeo-type material which process comprises treating the membrane with a silicic acid and/or polysilicic acid or a mixture of silicic and/or poysilicic acids.

Zeo-type materials are also known as molecular sieves which are widely known and used. They comprise an extended network of channels formed from silicon/oxygen tetrahedrons joined through the oxygen atoms. Zeolites and alumino-silicates are the most commonly known form of zeo-type materials and the present invention is applicable to any membrane formed from zeo-type materials and particularly applicable to zeolites and alumino-silicates. In the "Atlas of Zeolite Structure Types", Meier and Ofsen, 1987, Polycrystal Book Service, Pittsburg USA, various types of structure are described and, for example, those described as having LTA, MEL, MFI or TON structure can be used.

In "New Developments in Zeolite Science and Technology Proceedings of the 7th International Conference, Tokyo, 1986, page 103, another class of zeo-type materials are disclosed as crystalline aluminophosphate, silicoalumina phosphates and other metalloalumino phosphates.

Typical zeolites which can be used in the present invention are Zeolites include but are not limited to, 3A, 4A, 5A, 13X X Y, ZSM5, MPOs, SAPOs, Silicalite, $\beta$, $\theta$,etc.

The porous supports on which zeo-type membranes are formed and which can be used in the present invention include those formed of metals, ceramics, glass, mineral, carbon or polymer fibers or cellulosic or organic or inorganic polymers. Suitable metals include titanium, chromium and alloys such as those sold under the Trade Marks "Fecralloy" and "Hastalloy" and stainless steels. The porous supports may be formed of a mesh or from sintered metal particles or a mixture of both. These are commonly sold in the form of filters.

Porous ceramics, glass mineral or carbon materials can be used including porous silicon and other carbides, clays and other silicates and porous silica. If desired, the support can be a zeolite formed by compression or using a binder. The shape of the support is not critical, for example, flat sheet, tubular, wound spiral etc. can be used. If polymeric materials are used, these can optionally be film coated with metal or metal oxide or a silicic acid as herein defined.

The porous support can be also be a granular solid e.g. formed of particles of a closely packed material such as a pellitised catalyst.

The present invention can be used with porous supports of any suitable size although, for large flux rates through a membrane, large pore sizes are preferred. Preferably pore sizes of 0.01 to 2,000 microns, more preferably of 0.1 to 200 and ideally of 1 to 20 microns are used. Pore sizes up to 300 microns can be determined by bubble point pressure as specified in ISO 4003. Larger pore sizes can be measured by microscopic methods.

The larger the relative amount of the surface which is composed of voids in general the more suitable the porous support.

The membranes which can be treated by the method of the present invention can be formed by any method, for example by crystallisation from a gel or solution, by plasma deposition or by any other method such as electro deposition of crystals on conducting substrates e.g. as described in DE 4109037.

When the membrane comprising a film of zeo-type material is prepared by crystallisation from a synthesis gel, any of the methods described in the prior art can be used.

The synthesis gel used in the process can be any gel which is capable of producing the desired crystalline zeo-type material. Gels for the synthesis of zeo-type materials are well known and are described in the prior art given above or, for example, in EP-A-57049, EP-A-104800, EP-A-2899 and EP-A-2900. Standard text books by D W Breck ("Zeolites Molecular Sieves, Structure Chemistry and Use") published by John Wiley (1974) and P. A Jacobs and J. A Martens (Studies in Surface Science and Catalysis No. 33, Synthesis of High Silica Alumino silicate Zeolites" published by Elsevier (1987), describe many such synthesis gels. The process which can be used includes conventional syntheses of zeo-type materials, except that the synthesis is carried out in the presence of the porous support. Most commonly, gels are crystallised by the application of heat.

The membrane which is treated by the process of the invention can be prepared by a process which comprises deposition or crystallisation from a growth medium. In one embodiment of the invention the growth medium can be used in two different methods.

In the gel method (method 1) for forming the membrane the gel used to form the membrane preferably has a molar composition in the range of

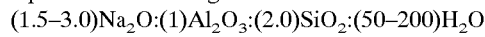
$(1.5–3.0)Na_2O:(1)Al_2O_3:(2.0)SiO_2:(50–200)H_2O$ and the method used can be used in any of the methods disclosed in the references listed above In the liquid solution method (method 2) the liquid solution used to form the membrane preferably has a molar composition in the range of:

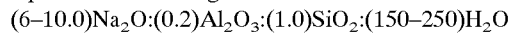
$(6–10.0)Na_2O:(0.2)Al_2O_3:(1.0)SiO_2:(150–250)H_2O$

The liquid solution preferably contains a maximum amount of the compound capable of crystalising to form a zeo-type material whilst still remaining a liquid solution. By maximum amount is meant the maximum amount which can be maintained in solution so that no precipitation occurs before zeolite formation.

Methods (1) and (2) can be used under the conditions listed below and method (1) and method (2) can be used either on their own or with method (1) followed by method (2) or vice versa.

The conditions which can be used for forming the membrane are with a temperature of the growth solution preferably in the range of 50 to 100° C. and the pH can be adjusted e.g. to pH of 12.5 to 14 by addition of sodium hydroxide or ammonia. If desired the sodium ion concentration can be increased without increasing the pH by the addition of a sodium salt such as sodium chloride. The growth solution can be seeded with zeolite crystals of the desired zeolite to be synthesised. The membrane can be washed to pH neutral after membrane formation prior to any-post-treatment.

The porous support can be contacted with the growth medium by immersion or by pouring the growth medium over the support with the support held substantially horizontal, either face up at the bottom of a container, or face down at the surface of the growth medium, or it can be passed over one or both sides of the support, with the support held substantially horizontal, or it can be passed over one or both sides of the support with the support held substantially vertical or the support can be in any intermediate position.

The growth medium can be kept static, stirred, tumbled or passed over or around the support, alternatively the growth medium can be passed over both sides of the support with the support held substantially horizontal or at any intermediate position. Pressure may also be applied but it is usually convenient to conduct the crystallisation under autogenous pressure. Preferably the porous support is completely immersed in the growth medium; alternatively, if desired, only one surface of the support may be in contact with the growth medium. This may be useful, for example, if it is desired to produce a membrane in the form of a tube, where only the inside or outside of the tube need be in contact with the growth medium.

It may be useful if it is desired to produce a membrane containing two different zeolites, one on each side of the support. Use of such a bi-functional membrane would be equivalent to using two separate membranes, each carrying a different zeolite.

If desired, the treatment with the gel or liquid solution can be repeated one or more times to obtain thicker membrane coatings.

Preferably the porous support is pre-treated with a zeolite initiating agent. The zeolite initiating agent is preferably a cobalt, molybdenum or nickel oxide or it can be particles of a zeolite, e.g. the zeolite which it is intended to deposit on the porous support, or any combination of these. Another example of an initiating agent is a compound which can deposit a zeo-type pre-cursor material e.g. a silicic acid or polysilicic acid.

The zeolite initiation agent can be contacted with the porous support by a wet or dry process. If a dry process is used, the particles of the zeolite initiation agent can be rubbed into the surface of the porous material, or the porous material surface can be rubbed in the particles.

Alternatively the particles of the zeolite initiation agent can be caused to flow over and/or through the porous support, or pulled into the support by means of a vacuum.

If a wet process is used, a liquid suspension of powder of the zeoite initiation agent is formed and the liquid suspension contacted with the porous support to deposit the zeolite initiation agent on the support.

Before contacting the surface of the porous support with the zeolite initiation agent the surface is preferably wetted with wetting agent such as an alcohol, water or a mixture of these.

When a silicic acid is used as an initiating agent it can be a silicic acid as herein defined.

In the present specification by silicic acid is meant monosilicic, low, medium and high molecular weight polysilicic acids and mixtures thereof.

Methods of making silicic acids are described in GB Patent Application 2269377 and a prefer-red method is by acidification of a sodium silicate solution followed by separation of the suicic acid by phase separation using an organic solvent such as tetrahydrofuran. The organic phase can then be dried and anhydrous silicic acid separated e.g. by addition of n-butanol to obtain a substantially anhydrous solution of silicic acid. The degree of polymerisation of the silicic acid depends on the actual conditions used e.g. the time the sodium silicate solution is in contact with the acid before addition of the organic solvent, temperature etc.

The silicic acid used in the present invention preferably has an average molecular weight in the range of 96 to 10,000 and more preferably of 96 to 3220.

The silicic acids are k now n compounds and are usually prepared as a mixture of acids with a range of different molecular weights and this mixture is suitable for use in the present invention.

The silicic acids are combination of silicon, oxygen and hydrogen, linked together in the case of polysilicic acids through an oxygen bridge, with terminal —OH groups.

They have a generic formula of $Si_nO_p(OH)_r$ where n, p and r can vary from n=1, p=0, r=4 in the case of monosilicic acid through to n=8–12, p=12–20, r=8–12 in the case of medium molecular weight silicic acids through to n=20–32, p=36–60 and r=8–20 in the case of a higher molecular weight polymers.

The membrane is preferably treated with anhydrous silicic acid and a preferred method is to contact the membrane with an anhydrous solution of the silicic acid e.g. by dipping, pulling through with vacuum, forming with pressure etc. Preferably the solution containing the silicic acid is removed e.g. by evaporation at room temperature and/or by heating. Alternatively cross-linking can be accomplished by treating with an acid or base or with acidified or basified water e.g. of pH 2 to 12 preferably of 4 to 10.

The silicic acids used in the present invention can be used in "narrow" molecular weight distribution as formed or in a combination of different molecular weight ranges.

Greater flexibility can be introduced into the final membranes by treating them with a flexibilising agent by adding e.g. a hydroxy terminated polysiloxane into the silicic acid solution before treatment of the membrane.

The membranes treated by this process are improved in terms of their performance and membrane strength compared with untreated membranes.

The membranes formed using the present invention can be used in a range of separation and catalytic processes, e.g. dehydration of LPG, air, alcohols and natural gas, removing linear alkanes, olefins and substituted hydrocarbons from mixtures with branched chain compounds, e.g. in reforming, dewaxing, etc., hydrogenation and dehydrogenation of linear hydrocarbon in admixture with branched chain compounds.

The invention is described in the following Examples in which Example 1 is the preparation of a membrane using a known method, Examples 2, 3, 4 and 5 are Examples of the preparation of silicic acids, Example 6a illustrates the test procedure used to test the membranes and the testing of a known membrane, Examples 6b and 7–19 are Examples of production and testing of membranes.

EXAMPLE

Membrane Growth

The substrate used was a Bekipor (Trade Mark) ST 5BL3 filter. This consists of very fine 316 stainless steel fibers brought together in a 3-dimensional labyrinthic structure. The fibers are arranged randomly in a homogeneous web. This web is further compacted and sintered to give a very strong metallic bond at each fibre crossing. The average pore size is approximately 5.3 microns and the diameter of the wire on the surface is 6.5 microns.

A 7 cm. disc of the metal mesh was placed in a 100 ml flat bottomed petri dish which had previously been cleaned by washing with de-ionised water, acetone, toluene and finally acetone before being dried in an oven at 90 degrees C. for 3 hours.

Two solutions A and B were prepared separately in two 500 ml glass bottles as follows:
Solution A 24.49 g Sodium Aluminate, 3.75 g Sodium Hydroxide and 179.74 g de-ionised water were mechanically shaken until dissolved. The Sodium Aluminate had an actual composition 62.48% $Al_2O_3$, 35.24% $Na_2O$, and 2.28% $H_2O$.
Solution B 50.57 g Sodium Silicate of composition 14.21% $Na_2O$, 35.59% $SiO_2$ and 50.20% $H_2O$ was dissolved in 179.74 g de-ionised water.

Solution A was added slowly to solution B with both stirring and shaking by hand to ensure complete and even mixing (it is important that no lumps of hydrogel are formed). This resulted in a hydrogel having a molar composition 2.01 $Na_2O:Al_2O_3:2.0$ $SiO_2:143.10$ $H_2O$
100 ml of the hydrogel was slowly poured into the petri dish containing the cobalt oxide treated mesh. The petri dish was placed in a domestic pressure cooker together with a beaker containing the remaining hydrogel solution. The pressure cooker was placed in an oven preheated to 90 degrees C. for 20 hours.

Subsequently it was removed from the oven and allowed to cool for 30 minutes. The petri dish was removed and the solution poured away.

The metal mesh was carefully removed with a long flat rod ensuring that the mesh was not bent or damaged in any way. The mesh was placed in a glass beaker and washed three times with 100 ml aliquots of de-ionised water, swirling the solution each time to ensure complete removal of residues. The glass beaker was placed in an oven for three hours at 90 degrees C.

The surface of the dried coated mesh was subsequently wiped clean with a clean lens tissue in order to remove any loose powdery deposits which may have formed on the surface. The mesh was inverted and the process repeated.

The mesh was reinverted and the top surface cleaned again. It was then washed with de-ionised water and dried in an oven for 3 hours at 90 degrees C.

The growth and cleaning procedure was repeated three more times. X-ray Analysis showed this to be a Zeolite 4A

EXAMPLE 2

Preparation of Polysilicic acid in n-butanol

Prepolymerised silicic acid in organic solution was prepared from "Soluble Sodium Silicate C Powder" (Ex: Crosfield, Trade Name Pyramid P40) with mean $SiO_2/Na_2O$ weight ratio 2.00:1 and molar ratio 2.06:1, mean $Na_2O$ 27%, mean $SiO_2$ 53.00% mean water 20.00% and total solid 80.00%.

200 g (containing 106 g $SiO_2$) of this powder was dissolved in water (835 ml) to produce a solution which was added dropwise into an aqueous hydrochloric acid solution (3M, 1000 ml.) at 0–10 degrees C. with stilling over a 45 minute period, followed by a further stirring for 90 minutes.

Tetrahydrofuran (THF, 1000 ml.) and sodium chloride (500 g) were then added with stirring, followed by a further 60 minutes stirring and 30 minutes standing to produce an organic phase containing silicic acid and an aqueous phase.

The organic phase was separated and dried with molecular sieve 4A (⅛ inch beads, 4–8 mesh, 200 g). To the dried phase was added n-butanol (1.28 liters) and the solution obtained distiled for 2 hrs. to give a clear solution of prepolymerized silicic acid in butanol (500 g, containing 103 g $SiO_2$) which is substantially anhydrous.

The silicic acid can be analysed by treatment with trimethyl chlorosilane in dimethyl formamide to form trimethylsilyl derivatives followed by gel permeation chromatography and can form a single peak found to be a mixture of polysilicic acids of mean molecular weight of about 800.

EXAMPLE 3

The procedure of Example 2 was followed except that after the addition of sodium silicate to the acid, the additional time of stirring was 45 minutes. This ultimately gave a lower molecular weight silicic acid than in Example 2 with a mean molecular weight of about 1600.

EXAMPLE 4

The procedure of Example 2 was followed except that after the addition of sodium silicate to the acid, the additional time of stirring was 180 minutes. This ultimately gave a higher molecular weight silicic acid than in Example 2 with a mean molecular weight of about 3,200.

EXAMPLE 5

The procedure of Example 2 was followed except that after the addition of sodium silicate to the acid, there was no additional time of stirring. This gave a very low molecular weight silicic acids with a mean molecular weight of about 96.

EXAMPLE 6a—Membrane Test Procedure

A membrane is loaded into a pervaporated test cell in an apparatus as shown in the accompanying drawing. The apparatus consists of a stainless steel test cell (1) fitted with a pressure gauge (2) relief valve (3) magnetic stirrer (4) and thermocouple (5). The membrane prepared as in Example 1 was placed on a porous stainless steel disc (6) and was sealed into the cell with O ring (7).

The cell could be simultaneously heated and stirred by a heater/stirrer (8). Vacuum could be applied through line (9). Vapor removed from the test cell was condensed out in cold trap (10). Line (9) had a pressure gauge (11) and relief valve (12).

The test cell was filled with an isopropanol/water (IPA/$H_2O$) mixture (90/10 wt. % respectively). The membrane was tested at approximately 70 degrees C.

The pressure on the side of the membrane remote from the liquid was reduced to 4 mbar (0.4 kN). Permeate was collected over periods of 8 hours and weighed, and small aliquots were analysed, feed water concentration was monitored throughout. The water flux and permeate water content as a function of feed water concentration are shown together in Table 1.

TABLE 1

Dehydration Performance of Zeolite Membrane of Example 1 Isopropanol/water mixture at 70° C.

| Time on Stream (hours) | Feed Water % Weight | Permeate Water % weight | Permeate Water Flux (J) kg./m²/day |
|---|---|---|---|
| 1.0 | 8.9 | 71.7 | 121.9 |
| 1.5 | 7.9 | 69.4 | 113.4 |
| 2.0 | 7.6 | 68.1 | 109.7 |
| 2.5 | 7.4 | 70.1 | 111.1 |
| 3.0 | 7.2 | 68.1 | 110.0 |
| 3.5 | 7.0 | 68.7 | 103.3 |
| 4.0 | 6.9 | 67.6 | 102.7 |
| 4.5 | 6.4 | — | — |

EXAMPLE 6
Post Treatment 1 and Improved Pervaporation Results

The silicic acid in n-butanol produced in Example 2 was diluted with ethanol to 5% wt. solids. 50 ml. of this solution was placed on the feed side of the membrane synthesised in Example 1 in the test cell outlined above, after the test feed from the pervaporation test of Example 6a had been removed. The test cell was heated to 70 degrees C. and a vacuum of 4 mB (0.4 kN) was applied to the permeate side of the membrane for 7 hours with stirring, after which the test cell was cooled to room temperature.

The remaining post treatment solution, on the feed side, was decanted and the test cell was re-heated to 70 degrees C., with vacuum for 24 hours to cross-link the silicic acid in the pores of the membrane. The test cell was again cooled and fresh feed added(IPA/Water 90/10 wt. % respectively) and the pervaporation test procedure repeated as in Example 6a, the results are shown in Table 2.

TABLE 2

Dehydration Performance of Zeolite Membrane of Example 1 after post treatment 1, Isopropanol/water mixture at 70° C.

| Time on Stream (hours) | Feed Water % Weight | Permeate Water % weight | Permeate Water Flux (J) kg./m²/day |
|---|---|---|---|
| 1.0 | 9.4 | 99.5 | 95.8 |
| 1.5 | 7.6 | 99.4 | 97.8 |

TABLE 2-continued

Dehydration Performance of Zeolite Membrane of Example 1 after post treatment 1, Isopropanol/water mixture at 70° C.

| Time on Stream (hours) | Feed Water % Weight | Permeate Water % weight | Permeate Water Flux (J) kg./m²/day |
|---|---|---|---|
| 2.0 | 7.5 | 99.3 | 87.6 |
| 2.5 | 7.4 | 99.4 | 92.3 |
| 3.0 | 7.0 | 99.2 | 85.3 |
| 3.5 | 6.8 | 99.3 | 86.5 |
| 4.0 | 6.3 | 99.3 | 85.1 |
| 4.5 | 6.0 | | |

There is a great improvement in selectivity after post treatment.

EXAMPLE 7
Post Treatment 2

A membrane produced by the method as described in Example 1 was treated under pervaporation conditions described in Example 6a and the results shown in Table 3.

TABLE 3

Dehydration Performance of Zeolite Membrane of Example 1 Isopropanol/water mixture at 70° C.

| Time on Stream Stream (hours) | Feed Water % weight | Permeate Water % weight | Permeate Water Flux (J) kg/m²/day |
|---|---|---|---|
| 1.0 | 9.4 | 75.9 | 82.4 |
| 1.5 | 8.9 | 74.4 | 74.4 |
| 2.0 | 8.8 | 75.2 | 71.2 |
| 2.5 | 8.6 | 74.1 | 66.7 |
| 3.0 | 8.2 | 71.3 | 65.2 |
| 3.5 | 8.0 | 70.2 | 61.5 |
| 4.0 | 7.8 | 70.1 | 57.1 |
| 4.5 | 7.5 | 69.2 | 59.2 |
| 5.0 | 7.4 | — | — |

The membrane was then post treated as in Example 6b except that a 10% solution of silicic acids was used to post treat the mesh and air was drawn over the feed side of the membrane to cure the silicic acid, the test cell being heated to 70 degrees C. for 7 hours to aid cross-linking.

The test cell was then cooled to room temperature and the membrane re-tested under pervaporation conditions as in Example 6b and the results shown in Table 4.

TABLE 4

Dehydration Performance of Zeolite Membrane of Example 7 after post treatment 2 Isopropanol/water mixture at 70° C.

| Time on Stream (hours) | Feed Water % Weight | Permeate Water % weight | Permeate Water Flux (J) kg./m²/day |
|---|---|---|---|
| 1.0 | 9.2 | 99.8 | 65 |
| 1.5 | 8.7 | 99.8 | 65.2 |
| 2.0 | 8.2 | 99.7 | 66.4 |
| 2.5 | 7.9 | 99.7 | 61.6 |
| 3.0 | 7.7 | 99.7 | 59.3 |
| 3.5 | 7.2 | 99.7 | 60.0 |
| 4.0 | 7.1 | 99.7 | 54.0 |
| 4.5 | 6.8 | — | — |

There is a great improvement in selectivity after post treatment.

The membrane was also tested with an IPA/water feed of 99/1 wt % respectively, the results of which are shown in Table 5

TABLE 5

Dehydration Performance of Zeolite Membrane of Example 7 after post treatment 2. Isopropanol/water mixture at 70° C.

| Time on Stream (hours) | Feed Water % Weight | Permeate Water % weight | Permeate Water Flux (J) kg./m²/day |
|---|---|---|---|
| 1.0 | 0.64 | 89.8 | 2.9 |
| 1.5 | 0.61 | 90.9 | 3.3 |
| 2.0 | 0.56 | 91.7 | 7.3 |
| 2.5 | 0.55 | 92.1 | 2.8 |
| 3.0 | 0.52 | 92.9 | 6.7 |
| 3.5 | 0.48 | 94.5 | 2.4 |
| 4.0 | 0.44 | 88.4 | 3.5 |
| 4.5 | 0.41 | | |

There is a great improvement in selectivity after post treatment.

EXAMPLE 8

Mixed Growth Membrane (a) Preparation of Cobalt Oxide 100 g of Cobalt(II) Nitrate Hexahydrate was heated in a ceramic crucible for 6 hours at 500 degrees C. to convert it to the oxide and then cooled to room temperature in the furnace. The resultant oxide was ground to a fine powder of particle size 0.5 to 2 microns using a mortar and pestle.

(b) Pretreatment

The substrate used was a, Bekipor (Trade Mark) XL 3 61S filter. This consists of very fine 316 stainless steel fibers brought together in a 3-dimensional labyrinthic structure. The fibers are arranged randomly in a homogeneous web. This web is further compacted and sintered to give a very strong metallic bond at each fibre crossing.

The average pore size is approximately 5 microns and the diameter of the wire on the surface is 2 microns.

A 7 cm. disc was cut out from a sheet of this material and de-greased by soaking it in a beaker containing approximately 200 ml toluene for 1 hour (the toluene was replaced twice).

The toluene was then replaced by acetone and the washing procedure repeated. The metal mesh was subsequently put in a clean petri dish and dried in an oven for 3 hours at 90 degrees C.

The clean dry metal mesh was removed from the petri dish and placed flat on paper towelling. 5 grams of the cobalt oxide prepared in (a) was rubbed into the top metal surface using a finger of a glove protected hand, until the surfaces were a matt black color. Excess of the cobalt oxide was removed by gently tapping the mesh, this left 0.25 g of cobalt oxide within the pores on the topside of the mesh.

(c) First Growth Hydrogel Synthesis

This was carried out as in Example 1 (once only)

(d) Second Growth Solution Synthesis

The petri dish and mesh prepared as in (c) above had the following treatment performed on it.

Two solutions A and B were prepared separately in two 500 ml glass bottles as follows:

Solution A 3.26 g Sodium Aluminate, 74.74 g Sodium Hydroxide and 165.50 g de-ionised water were mechanically shaken until dissolved. The Sodium Aluminate had an actual composition 62.48% $Al_2O_3$, 35.24% $Na_2O$, and 2.28% $H_2O$.

Solution B 21.11 g Sodium Silicate of composition 14.21% $Na_2O$, 35.59% $SiO_2$ and 50.20% $H_2O$ was dissolved in 165.5 g de-ionised water.

The molar composition based on the analysis figures in Example 1 above was

10 $Na_2O:SiO_2:0.2\ Al_2O_3:200\ H_2O$.

Solution A was added slowly to solution B with both stirring and shaking by hand to ensure complete and even mixing.

The petri dish was replaced in the domestic pressure cooker together with a beaker containing the remaining solution. The pressure cooker was placed in an oven for 3 hours at 90 degrees C. Subsequently it was removed from the oven and the petri dish removed whilst still hot and the solution poured away. The mesh was washed vigorously three times with 100 ml aliquots of de-ionised water swirling the solution each time to ensure complete removal of residues.

The mesh was then allowed to dry overnight before being removed from the petri dish with a long flat rod ensuring that the mesh was not bent or damaged in any way. X-ray analysis showed this to be a Zeolite 4A.

EXAMPLE 9

The membrane formed in Example 8 was tested under pervaporation conditions described in Example 6a. The results of which are shown in Table 6.

TABLE 6

Dehydration Performance of Zeolite Membrane of Example 8 Isopropanol/water mixture at 70° C.

| Time on Stream (hours) | Feed Water % Weight | Permeate Water % weight | Permeate Water Flux (J) kg./m²/day |
|---|---|---|---|
| 1.0 | 8.8 | 56.5 | 76.4 |
| 1.5 | 8.4 | 63.3 | 75.3 |
| 2.0 | 8.1 | 67.1 | 76.1 |
| 2.5 | 8.0 | 70.8 | 73.4 |
| 3.0 | 7.7 | 72.5 | 70.9 |
| 3.5 | 7.5 | 72.7 | 64.0 |
| 4.0 | 7.3 | 71.4 | — |
| 4.5 | 7.1 | — | — |

EXAMPLE 10

After pervaporation testing in Example 9 of the membrane formed in Example 8 was post treated as in Example 7 and retested under pervaporation conditions as in Example 6a. The results of which are shown in Table 7.

TABLE 7

Dehydration Performance of Zeolite Membrane of Example 8 after post treatment 2, Isopropanol/water mixture at 70° C.

| Time on Stream (hours) | Feed Water % Weight | Permeate Water % weight | Permeate Water Flux (J) kg./m²/day |
|---|---|---|---|
| 1.0 | 8.6 | 96.3 | 70.5 |
| 1.5 | 8.0 | 96.2 | 64.3 |
| 2.0 | 7.9 | 96.2 | 65.4 |
| 2.5 | 7.7 | 96.2 | 62.5 |
| 3.0 | 7.5 | 96.0 | 59.4 |
| 3.5 | 7.3 | 96.0 | 59.3 |
| 4.0 | 7.1 | 96.0 | 58.7 |
| 4.5 | 6.9 | — | — |

There is a great improvement in selectivity after post treatment.

EXAMPLE 11
Post Treatment 3

A membrane produced by the method as described in Example 8 was treated under pervaporation conditions as described in Example 6a, the results are shown in Table 8. The membrane was then post treated as in Example 6b except that before the silicic acid was put in the test cell and after the silicic acid had been decanted, the feed side of the membrane was washed with 3 times 50 ml/aliquots of ethanol, (AR). In the former case the ethanol served to dry the surface of the membrane and in the latter to remove excess silicic acid from the surface where defects do not occur.

Also the method of cross-lining the silicic acid was different, in this case 100 ml of an IPA/water mixture (50:50 wt. %) was added to the feed side of the cell, which was heated at 70 degrees C. for 1 hour with stirring and no vacuum. After which the remaining solution on the feed side was decanted, once cool, and the pervaporation test of Example 5 repeated. The results are shown in Table 9.

TABLE 8

Dehydration Performance of Zeolite Membrane of Example 10, Isopropanol/water mixture at 70° C.

| Time on Stream (hours) | Feed Water % Weight | Permeate Water % weight | Permeate Water Flux (J) kg./m²/day |
|---|---|---|---|
| 1.0 | 8.7 | 85.5 | 116.6 |
| 1.5 | 7.7 | 84.6 | 106.2 |
| 2.0 | 7.6 | 84.5 | 102.6 |
| 2.5 | 7.4 | 84.4 | 103.6 |
| 3.0 | 7.2 | 84.9 | 110.6 |
| 3.5 | 6.8 | 84.0 | 96.4 |
| 4.0 | 6.7 | 84.0 | 95.5 |
| 4.5 | 6.5 | | |

TABLE 9

Dehydration Performance of Zeolite Membrane of Example 10 after post treatment 3, Isopropanol/water mixture at 70° C.

| Time on Stream (hours) | Feed Water % Weight | Permeate Water % weight | Permeate Water Flux (J) kg./m²/day |
|---|---|---|---|
| 1.0 | 10.0 | 93.1 | 125.2 |
| 1.5 | 8.5 | 91.9 | 117.4 |
| 2.0 | 8.4 | 91.6 | 116.4 |
| 2.5 | 8.2 | 91.1 | 111.9 |
| 3.0 | 7.9 | 91.3 | 113.4 |
| 3.5 | 7.8 | 90.5 | 107.9 |
| 4.0 | 7.5 | 90.5 | 107.0 |
| 4.5 | 7.2 | — | — |

There is an improvement in selectivity after post treatment.

EXAMPLE 12
Post Treatment 4

A membrane produced by the method as described in Example 8 was treated under pervaporation conditions as described in Example 6a, the results are shown in Table 10.

The membrane was then post treated as in Example 11 except instead of using IPA/water to aid the cross linking of the silicic acid, 100 ml of de-ionised water (pH 6) was used instead.

After cross-linking the remaining solution on the feed side was decanted, once cool, and the pervaporated test of Example 6a repeated. The results are shown in Table 11.

Dehydration Performance of Zeolite Membrane of Example 10, Isopropanol/water mixture at 70° C.

TABLE 10

| Time on Stream (hours) | Feed Water % Weight | Permeate Water % weight | Permeate Water Flux (J) kg./m²/day |
|---|---|---|---|
| 1.0 | 9.3 | 67.7 | 101.2 |
| 1.5 | 8.6 | 66.4 | 103 |
| 2.0 | 8.4 | 66.3 | 101.9 |
| 2.5 | 8.3 | 66.6 | 100.3 |
| 3.0 | 8.0 | 67.0 | 91.0 |
| 3.5 | 7.7 | 66.4 | 99.2 |
| 4.0 | 7.6 | 65.9 | 90.1 |
| 4.5 | 7.5 | — | — |

TABLE 11

Dehydration Performance of Zeolite Membrane of Example 12 after post treatment 4, Isopropanol/water mixture at 70° C.

| Time on Stream (hours) | Feed Water % Weight | Permeate Water % weight | Permeate Water Flux (J) kg./m²/day |
|---|---|---|---|
| 1.0 | 11.3 | 97.6 | 121.8 |
| 1.5 | 9.3 | 97.2 | 119.7 |
| 2.0 | 9.1 | 97.3 | 118.1 |
| 2.5 | 8.7 | 97.2 | 115.2 |
| 3.0 | 8.6 | 97.5 | 112.7 |
| 3.5 | 8.3 | 97.3 | 111.8 |
| 4.0 | 8.0 | 97.5 | 110.1 |
| 4.5 | 7.7 | | |

There is a great improvement in selectivity after post treatment.

EXAMPLE 13

The test cell as in Example 6a was prepared with a membrane made by any of the Examples, which was treated by rinsing with 2 aliquots of 25 g. of absolute alcohol and then adding 50 g. absolute alcohol. A vacuum was applied to the cell for about 15 minutes to replace any water in the membrane pores with absolute ethanol. The remainder of the ethanol was removed and the membrane was post treated as below:

| Post Treatment 5 - Preparation | | |
|---|---|---|
| 1. Polysilicic acids as in Example 2 | −24.5% active material | 3.40 g |
| 2. Polysilicic acids as in Example 3 | −15.6% active material | 5.36 g |
| 3. Silicic Acids as in Example 5 | −21.6% active material | 3.86 g |
| Added Ethanol | | 12.38 g |

In each case the post treatment solution was added to the feed side of the cold cell and vacuum was applied (4 mB(0.4 kN) and it was heated to 70° C. with stirring. After 3.5 hours the permeate was weighed but it was not recycled. The permeate was weighed every hour for eight hours. The post treatment solution was removed, the membrane rinsed with 2 aliquots of 25 g. ethanol the heating was switched off and air passed over the membrane from a compressor. After 8 hours the Test Cell was heated to 70° C., with air still being passed over the surface, for a further 8 hours. The membrane was then tested as in Example 6a.

EXAMPLE 14

The procedure of Example 13 was repeated except that the post treatment solution contained 1.25 g. of hydroxy terminated polydimethylsiloxane (viscosity 15–35 centistokes, ex ABCR P5340) (100% active material) in addition to that detailed in Example 13. The ethanol content was also increased from 12.38 g. to 23.63 g.

EXAMPLE 15

Pre Treatment With Polysilicic Acid 100 ml of polysilicic acid in n-butanol, as prepared in Example 2 with a molecular weight of about 800 was dried in an oven at 50° C. for 48 hours to evaporate the n-butanol. The resulting solid was ground to a fine powder of particle size 0.5–2 μm. using a pestle and mortar. 2 g. of the solid was rubbed into the top metal surface of the mesh described in Example 8 replacing the cobalt oxide with the solid, using a finger of a glove protected hand. Excess of the polysilicic acid was removed by gentle tapping of the mesh. This left 0.03 g. of solid within the pores of the support.

A zeolite membrane was formed on the treated support using the method described in (c) and (d) of Example 8.

The zeolite membrane with no post treatment was tested as in Example 6a and the zeolite membrane was post-treated using the method described in Example 14 and retested as in Example 6a and the results shown in Table 12.

TABLE 12

| Time on Stream (hours) | Feed Water % Weight | Permeate Water % weight | Permeate Water Flux (J) kg./m$^2$/day |
|---|---|---|---|
| Before Post Treatment | | | |
| 1.0 | 11.13 | 90.34 | 179.6 |
| 1.5 | 8.43 | 91.13 | 157.1 |
| 2.0 | 5.44 | 90.12 | 134.0 |
| 2.5 | 3.43 | 87.13 | 110.98 |
| 3.0 | 2.35 | 82.23 | 93.14 |
| 3.5 | 1.64 | 74.26 | 70.5 |
| 4.0 | 0.8 | 64.06 | 38.92 |
| 4.5 | 0.51 | 52.28 | 24.68 |
| 5.0 | 0.38 | 43.57 | 11.18 |
| 5.5 | 0.27 | 32.86 | 6.88 |
| After Post Treatment | | | |
| 1.0 | 10.87 | 100.00 | 149.7 |
| 1.5 | 7.88 | 100.00 | 127.3 |
| 2.0 | 5.61 | 100.00 | 97.9 |
| 2.5 | 3.26 | 100.00 | 86.43 |
| 3.0 | 2,19 | 99.5 | 57.75 |
| 3.5 | 1.29 | 99.30 | 26.63 |
| 4.0 | 0.85 | 98.3 | 23.23 |
| 4.5 | 0.49 | 96.6 | 9.10 |

EXAMPLE 16

A membrane was formed as in Example 15 and tested as in Example 6a and after post treatment as in Example 13 was retested as in Example 6a and the results shown in Table 13 below.

TABLE 13

Ethanol/Water Mixture at 70° C.

| Time on Stream (hours) | Feed Water % Weight | Permeate Water % weight | Permeate Water Flux (J) kg./m$^2$/day |
|---|---|---|---|
| Before Post treatment | | | |
| 1.0 | 14.13 | 72.15 | 177.92 |
| 1.5 | 10.75 | 73.32 | 134.67 |
| 2.0 | 7.97 | 69.03 | 105.57 |
| 2.5 | 5.71 | 69.88 | 77.38 |
| 3.5 | 3.86 | 60.90 | 55.09 |
| 4.0 | 2.53 | 59.87 | 36.64 |
| 4.5 | 1.60 | 52.67 | 23.53 |
| 5.0 | 0.95 | 42.70 | 15.77 |
| After Post Treatment | | | |
| 1.0 | 13.92 | 100.00 | 126.86 |
| 1.5 | 11.74 | 100.00 | 104.92 |
| 2.0 | 9.79 | 100.00 | 92.42 |
| 2.5 | 7.99 | 100.00 | 76.44 |
| 3.0 | 6.36 | 99.52 | 63.42 |
| 3.5 | 5.05 | 99.20 | 51.41 |
| 4.0 | 3.96 | 98.94 | 42.08 |
| 4.5 | 3.00 | 99.07 | 31.92 |
| 5.0 | 2.41 | 99.28 | 25.46 |
| 5.5 | 1.84 | 97.40 | 17.88 |
| 6.0 | 1.37 | 95.30 | 13.71 |

EXAMPLE 17

A membrane was formed as in Example 1 and tested as in Example 6a, this membrane was then post treated as in Example 14 and tested as in Example 6a and the results shown in Table 14 below.

TABLE 14

Ethanol/Water Mixture at 70° C.

| Time on Stream (hours) | Feed Water % Weight | Permeate Water % weight | Permeate Water Flux (J) kg./m$^2$/day |
|---|---|---|---|
| Before Post treatment | | | |
| 1.0 | 0.39 | 8.95 | 5.34 |
| 1.5 | 0.30 | 7.66 | 1.71 |
| 2.0 | 0.23 | 6.01 | 0.57 |
| 2.5 | 0.18 | 3.45 | 0.14 |
| After Post Treatment | | | |
| 1.0 | 6.50 | 99.67 | 47.54 |
| 1.5 | 9.06 | 100.00 | 54.13 |
| 2.0 | 8.11 | 100.00 | 63.19 |
| 2.5 | 6.83 | 100.00 | 52.09 |
| 3.0 | 5.78 | 100.00 | 54.87 |
| 3.5 | 4.66 | 100.00 | 49.57 |
| 4.0 | 3.67 | 100.00 | 44.75 |
| 4.5 | 2.79 | 100.00 | 35.29 |
| 5.0 | 0.41 | 95.34 | 3.81 |
| 5.5 | 0.36 | 94.84 | 1.33 |
| 6.0 | 0.29 | 90.42 | 1.68 |
| 6.5 | 0.28 | 85.72 | 0.91 |
| 7.0 | 0.26 | 68.46 | 0.37 |

EXAMPLE 18

A membrane was formed as in Example 8 and tested as in Example 6a, this membrane was then post treated as in Example 15 and tested as in Example 6a and the results shown in table 15.

TABLE 15

Ethanol/Water Mixture at 70° C.

| Time on Stream (hours) | Feed Water % Weight | Permeate Water % weight | Permeate Water Flux (J) kg./m²/day |
|---|---|---|---|
| Before Post Treatment | | | |
| 1.0 | 8.41 | 84.98 | 90.61 |
| 1.5 | 6.00 | 73.92 | 66.83 |
| 2.0 | 4.82 | 61.79 | 71.89 |
| 2.5 | 3.64 | 45.37 | 58.23 |
| 3.0 | 2.38 | 34.32 | 43.71 |
| 3.5 | 1.60 | 25.31 | 31.97 |
| 4.0 | 0.98 | 23.68 | 27.48 |
| After Post Treatment | | | |
| 1.0 | 14.17 | 100.00 | 114.70 |
| 1.5 | 12.21 | 100.00 | 105.06 |
| 2.0 | 10.33 | 100.00 | 92.66 |
| 2.5 | 8.46 | 100.00 | 81.98 |
| 3.0 | 6.79 | 99.71 | 65.20 |
| 3.5 | 5.47 | 99.51 | 56.45 |
| 4.0 | 4.36 | 99.25 | 44.23 |
| 4.5 | 3.34 | 98.89 | 36.05 |

EXAMPLE 19

A sample of Bekipor XL 361S was degreased as in Example 8 and sodium A zeolite crystals (Doucil 'P' ex Crosfield Catalysts) rubbed in using the method described in Example 8 replacing the cobalt oxide with the zeolite. This left 0.032 grams of Sodium A crystals within the pores on the topside of the mesh.

Hydrogel Synthesis

Two solutions were prepared separately in two 500 ml glass bottles as follows:

Solution A 48.98 g of sodium aluminate, 7.5 g sodium hydroxide and 207.32 g of de-ionised water were mechanically shaken until dissolved. The water had been preheated to boiling point, as had the glass vessel. The sodium hydroxide was added prior to the sodium aluminate. After mixing, the solution was placed on a stirrer-hotplate and heated until the temperature was 100° C. The sodium aluminate had the same composition as in Example 8.

Solution B 50.57 g of sodium silicate of the same composition as in Example 8 was dissolved in 207.32 g of de-ionised water. The glass bottle and de-ionised water having been heated to 50° C. beforehand.

The molar composition based on the analysis figures in Example 1 was

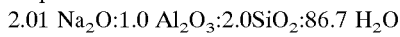
2.01 Na$_2$O:1.0 Al$_2$O$_3$:2.0SiO$_2$:86.7 H$_2$O

Solution A was added to solution B as in Example 8. Once mixed the resulting hydrogel was placed on the stirrer-hotplate and left stirring and heating for 15 minutes. The final temperature of the hydrogel was 98° C.

The mesh was mounted onto a flat polypropylene plate by means of a stainless steel 'O' ring that was bolted onto the hotplate. This assembly was then mounted vertically in a pre-heated PTFE lined stainless steel bomb that was at 100° C. Sufficient hydrogel was added to ensure that the top of the metal 'O' ring was covered. The bomb was sealed and placed in an oven at 100° C. for 3.5 hours. The polypropylene plate and mesh were removed and rinsed as in Example 8.

The zeolite membrane with no post treatment was tested as in Example 6a and the results shown in Table 16.

The membrane was subsequently post treated as in Example 13 and tested as in example 6a. The results are shown in Table 16.

TABLE 16

| Time on Stream (hours) | Feed Water % Weight | Permeate Water % weight | Permeate Water Flux (J) kg./m²/day |
|---|---|---|---|
| 1.0 | 11.58 | 41.93 | 151.44 |
| 1.5 | 9.28 | 40.98 | 118.33 |
| 2.0 | 7.36 | 40.06 | 96.84 |
| 2.5 | 5.63 | 36.94 | 75.85 |
| 3.0 | 4.18 | 32.13 | 55.52 |
| 3.5 | 2.97 | 26.34 | 42.27 |
| 4.0 | 2.15 | 19.92 | 30.34 |
| 4.5 | 1.46 | 14.47 | 20.83 |
| After Post Treatment | | | |
| 1.0 | 5.22 | 96.32 | 62.58 |
| 2.0 | 3.8 | 93.04 | 50.36 |
| 2.5 | 2.79 | 92.56 | 36.00 |
| 3.0 | 2.02 | 89.2 | 24.97 |
| 3.5 | 1.49 | 84.58 | 16.58 |
| 4.0 | 1.08 | 78.68 | 12.09 |
| 4.5 | 0.78 | 70.75 | 8.57 |

We claim:

1. A process for treating a crystalline Zeo-type membrane which process comprises depositing a film of Zeo-type material on a porous support and contacting the membrane so formed on the support with a silicic acid or a mixture of silicic acids.

2. A process as claimed in claim 1 in which the membrane is formed by crystallisation of a film of a zeo-type material from a synthesis gel by immersing a porous support in a synthesis gel comprising a gel of a zeo-type material and the zeo-type material deposited onto the porous support by the application of pressure and/or heat.

3. A process as claimed in claim 1 in which the zeo-type material is zeolite 3A,4A,5A,13X,X,Y,ZSM5,MPOs, SAPOs, Silicalite, β, or θ.

4. A process as claimed in claim 3 in which the porous support is pre-treated with a zeolite initiating agent selected from cobalt oxide, nickel oxide or molybdenum oxide, a zeolite or a silicic acid.

5. A process as claimed in claim 1 in which the crystalline zeo-type membrane is produced by a process which comprises immersing at least one surface of a porous support in a synthesis gel or solution which is capable of crystallising to produce a crystalline zeo-type material, inducing crystallisation of said gel so that zeo-type material crystallises on the support, removing the support from the mix and then contacting the porous support with a liquid solution containing a dissolved compound capable of crystallising from the solution to produce a crystallisation from the said solution so that a second coating of a zeo-type material crystallises on the support.

6. A process as claimed in claim 1 in which the crystalline zeo-type membrane is produced by a process which comprises immersing at least one surface of a porous support selected from sintered metal and porous ceramic supports in a synthesis gel or solution which is capable of crystallising to produce a crystalline zeo-type material, inducing crystallisation of said gel so that zeo-type material crystallises on the support, removing the support from the mix and then contacting the porous support with a liquid solution containing a dissolved compound capable of crystallising from the solution to produce a crystallisation from said solution so that a second coating of a zeo-type material crystallises on the support.

7. A process as claimed in claim 6 in which the zeo-type material is zeolite 3A,4A,5A,13X,X,Y,ZSM5,MPOs, SAPOs, Silicalite, β, or θ.

8. A process as claimed in claim 6 in which the porous support is pre-treated with a zeolite initiating agent selected from cobalt oxide, nickel oxide or molybdenum oxide, a zeolite or a silicic acid.

9. A process as claimed in claim 8 in which the membrane is treated with anhydrous silicic acid.

10. A process as claimed in claim 8 in which the silicic acid is cross-linked by treating with an acid or base.

11. A process as claimed in claim 10 in which a flexibilising agent is added to the silicic acid solution before treatment of the membrane.

12. A process as claimed in claim 11 in which the flexibilising agent is hydroxy terminated polysiloxane.

13. A process for treating a crystalline Zeo-type membrane which process comprises depositing a film of Zeo-type material on porous support and contacting the membrane so formed with a silicic acid having an average molecular weight in the range of 96 to 10,000 so that the silicic acid is cross-liked in the pores of the membrane.

14. A process as claimed in claim 13 in which the membrane is formed by crystallisation of a film of zeo-type material from a synthesis gel by immersing a porous support in a synthesis gel comprising a gel of a zeo-type material and the zeo-type material deposited onto the porous support by the application of pressure and/or heat.

15. A process as claimed in claim 14 in which the zeo-type material is zeolite 3A,4A,5A,13X,X,Y,ZSM5,MPOs, SAPOs, Silicalite, β, or θ.

16. A process as claimed in claim 15 in which the porous support is pre-treated with a zeolite initiating agent selected from cobalt oxide, nickel oxide or molybdenum oxide, a zeolite or a silicic acid.

17. A zeolite membrane treated by the process as claimed in claim 16.

18. A process as claimed in claim 16 in which the silicic acid has an average molecular weight in the range of 96 to 3220.

19. A process as claimed in claim 18 in which the silicic acid is a mixture of acids with a range of different molecular weights.

20. A process as claimed in claim 13 in which the membrane is formed by crystallisation of a film of a zeo-type material from a synthesis gel by immersing a porous support in a synthesis gel comprising a gel of a zeo-type material and the zeo-type material deposited onto the porous support by the application of pressure and/or heat and the membrane is treated with anhydrous silicic acid.

21. A process as claimed in claim 20 in which the silicic acid is cross-linked by treating with an acid or base.

22. A process as claimed in claim 20 in which a flexibilising agent is added to the silicic acid solution before treatment of the membrane.

23. A process as claimed in claim 22 in which the flexibilising agent is a hydroxy terminated polysiloxane.

24. A process as claimed in claim 13 in which a flexibilising agent is added to the silicic acid solution before treatment of the membrane.

25. A process as claimed in claim 24 in which the flexibilising agent is hydroxy terminated polysiloxane.

26. A zeolite membrane treated by the process as claimed in claim 25.

27. A zeolite membrane obtained by crystallization of a film of a zeolite material by immersing a porous support in a synthesis gel comprising a gel of zeo-type material onto the porous support by the application of pressure and/or heat and contacting the zeolite membrane surface with a silicic acid or mixture of silicic acids.

28. A zeolite membrane as claimed in claim 27 in which crystalline zeo-type membrane is produced by a process which comprises immersing at least one surface of a porous support selected from sintered metal and porous ceramic supports in a synthesis gel or solution which is capable of crystallising to produce a crystalline zeo-type material, inducing crystallisation of said gel so that zeo-type material crystallises on the support, removing the support from the mix and then contacting the porous support with a liquid solution containing a dissolved compound capable of crystallising from the solution to produce a crystallisation from the said solution so that a second coating of a zeo-type material crystallises on the support.

29. A process for treating a crystalline Zeo-type membrane, which process comprises of depositing a film of composite Zeo-type material on a porous support so as to form a substantially defect free membrane comprising of large sized pores and is obtained after a single treatment and a single growth steps, and contacting the membrane with a silicic acid or a mixture of silicic acids having a range of different molecular weights.

* * * * *